J. M. WEBSTER.
CASTER.
APPLICATION FILED MAR. 14, 1914.
1,138,818.
Patented May 11, 1915.
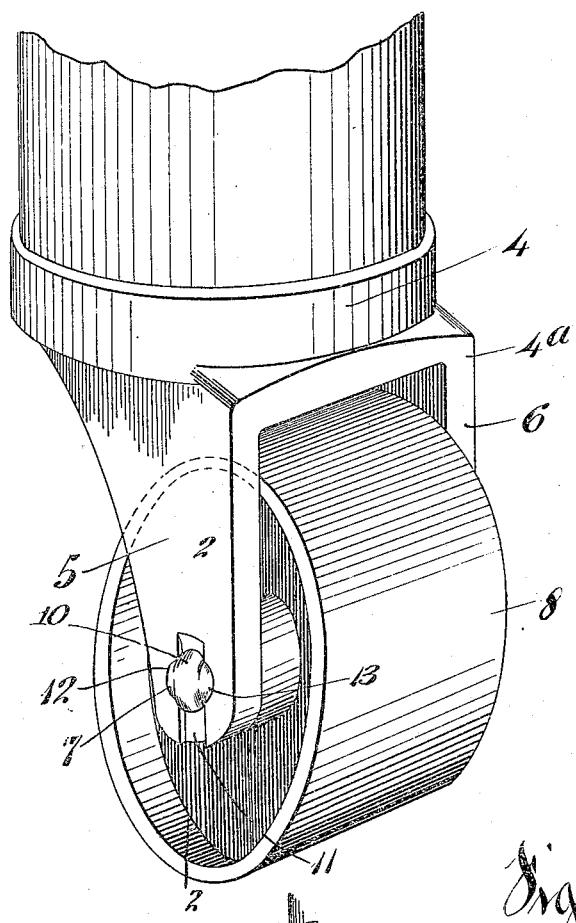
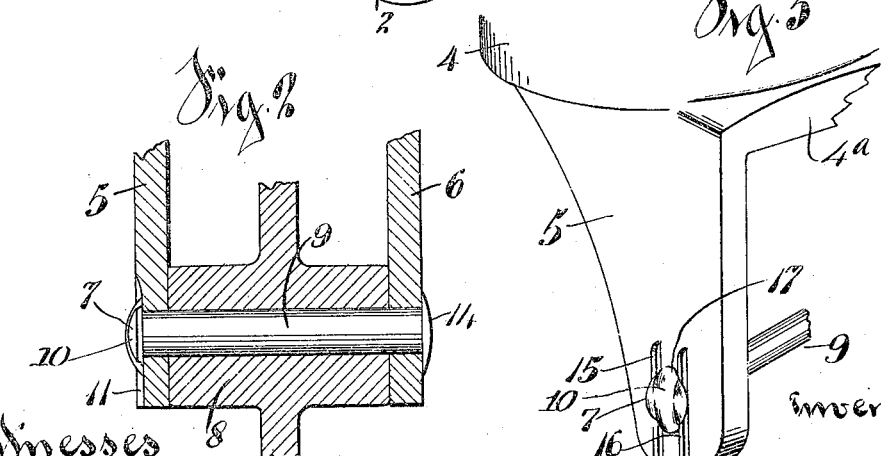

UNITED STATES PATENT OFFICE.

JOHN M. WEBSTER, OF CINCINNATI, OHIO, ASSIGNOR TO THE O. P. SCHRIVER CO., OF CINCINNATI, OHIO, A CORPORATION OF OHIO.

CASTER.

1,138,818.            Specification of Letters Patent.        Patented May 11, 1915.

Application filed March 14, 1914. Serial No. 824,796.

*To all whom it may concern:*

Be it known that I, JOHN M. WEBSTER, a citizen of the United States of America, and resident of Cincinnati, county of Hamilton, and State of Ohio, have invented certain new and useful Improvements in Casters, of which the following is a specification.

This invention relates to improvements in casters and has for an object to produce a caster whose axle is provided with a means for preventing its rotation in its mounting frame and which may be manufactured cheaply. This and other objects are attained in the caster described in the following specification and illustrated in the accompanying drawings in which:—

Figure 1 is a perspective view of a caster embodying my invention. Fig. 2 is a fragmental sectional view taken on the line 2—2 of Fig. 1. Fig. 3 is a fragmental perspective view of a modified form of axle mounting means embodying my invention.

The caster consists of the frame 4 having the axle mounting fork 4ª consisting of the branches 5 and 6. An axle 7 is mounted in holes formed in the ends of the branches and carries a roller or wheel 8 between the branches. The axle consists of a shaft portion 9 having a head 10, the shaft portion being sufficiently long to extend through and beyond the branch 6 when the axle is in place in the branches 5 and 6 and the head 10 is in engagement with the outer face of branch 5. A groove 11 is formed in the outer face of branch 5, across the opening through which the axle passes and is of less width than the diameter of the head 10.

In assembling the caster, the roller 8 is placed between the branches 5 and 6 of the frame and the shaft of the axle is placed through the hole in branch 5, through the hole in roller 8 and through the axle mounting hole in branch 6. The caster frame with the caster and axle in place is now laid over on the side of branch 6, upon an anvil or similar supporting surface, with the projecting straight end of the axle extending below the surface supporting the branch 6. The head 10 of the axle is now driven by a blow from a hammer, so that its major portion will lie within the groove 11 and its overlapping edges will be upset as shown in the drawing at 12 and 13. The frame with the roller and axle in place is now turned over and laid with the head of the axle resting upon the anvil surface. The projecting straight end of the axle is now riveted over as shown at 14, Fig. 2. It will thus be seen that the axle is prevented from turning with the wheel or roller 8 because of the engagement of head 10 with the slot or groove 11. This will prevent the ends of the axle as well as the ends of the branches 5 and 6 from becoming worn out because of the rotation of the short ends of the axle in the axle mounting holes of the branches.

In the modified form of my invention shown in Fig. 3, the ribs 15 and 16 form in effect the sides of a slot 17 in which the head of the axle will lie after it has been set into it as shown in Fig. 3.

It is thus seen that my improved means for securing the axle of the caster roller against rotation relatively to its mounting frame is at once simple, effective and cheap, and that casters embodying my improvement may be assembled rapidly because of the small amount of work involved.

Having thus described my invention, what I claim is:—

1. In a caster the combination of a frame, an axle mounted in the frame and a wheel loosely mounted on the axle, said frame having means formed thereon which are adapted to distort the head of the axle when said axle is driven into wheel mounting engagement with the frame.

2. In a caster the combination of a frame having a grooved axle-mounting fork, an axle and a caster wheel, the groove being adapted to lock the axle against rotation relatively to its mounting frame when the end of the axle is deformed by being driven into the groove to mount the wheel thereon.

In testimony whereof, I have hereunto subscribed my name this 13th day of March, 1914.

JOHN M. WEBSTER.

Witnesses:
  WALTER F. MURRAY,
  W. THORNTON BOGERT.

Copies of this patent may be obtained for five cents each, by addressing the "Commissioner of Patents, Washington, D. C."